LINEAR INDUCTION MOTOR
Original Filed May 1, 1970 3 Sheets-Sheet 1
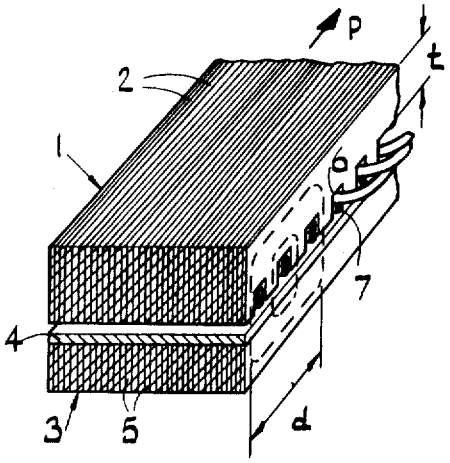
RRIOR ART Fig 1
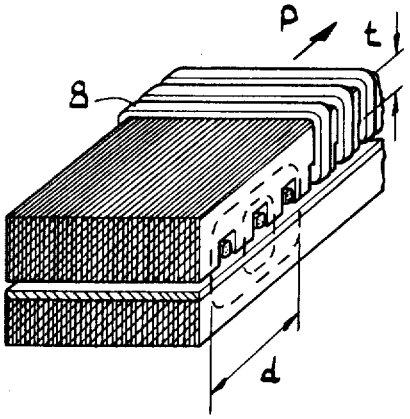
Fig 2 PRIOR ART
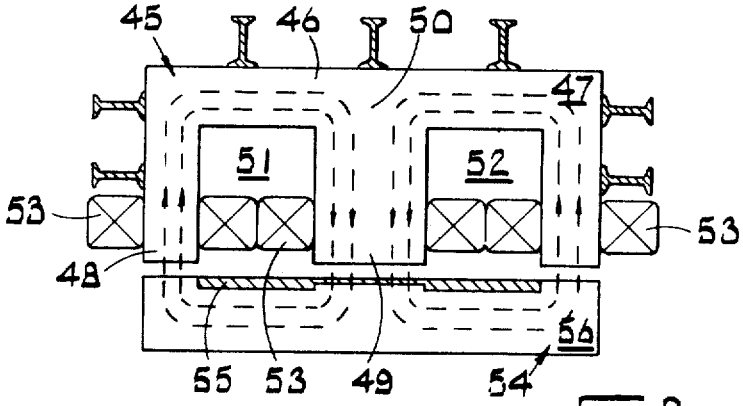
Fig 8
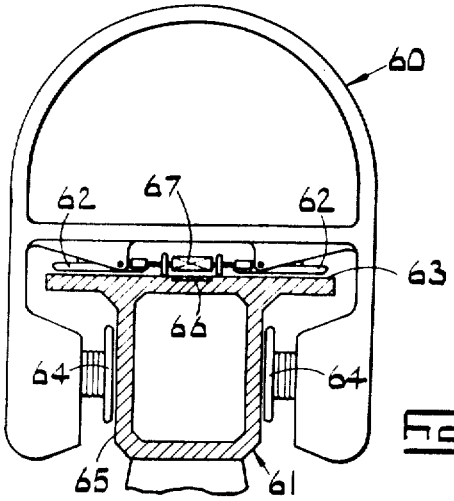
Fig 9
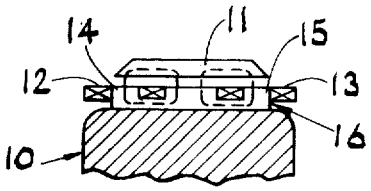
Fig 3 PRIOR ART United States Patent Office Re. 28,161
Reissued Sept. 17, 1974

28,161

LINEAR INDUCTION MOTOR

Hugh Robert Bolton, London, Thomas George Fellows, Barnet, Eric Roberts Laithwaite, Surbiton, John Frederick Eastham, Long Ditton, and Ernest Frederick Needham, Whittlesford, England, assignors to Tracked Hovercraft Limited, London, England Original No. 3,585,423, dated June 15, 1971, Ser. No. 33,596, May 1, 1970. Application for reissue Nov. 7, 1972, Ser. No. 304,420

Claims priority, application Great Britain, May 2, 1969, 22,542/69

Int. Cl. H02k *41/04*

U.S. Cl. 310—13 17 Claims

Matter enclosed in heavy brackets [ ] appears in the original patent but forms no part of this reissue specification; matter printed in italics indicates the additions made by reissue.

ABSTRACT OF THE DISCLOSURE

A polyphase linear induction motor comprising a primary member having magnetic material formed with a polyphase winding and, for co-operating with the primary member, a secondary member comprising electrically conductive material backed by further magnetic material is so arranged that the working flux passes in low reluctance paths lying substantially in planes directed transversely of the motor. The depth of magnetic material required for a particular air gap flux density is therefore substantially independent of the pole pitch so that large pole pitches and hence high synchronous speeds can be achieved with tolerable depths of magnetic material. A particular application of the invention is to high speed transportation systems in which the secondary member forms part of the prepared track.

This invention relates to linear induction motors, and in particular to polyphase linear induction motors.

Polyphase linear induction motors are of particular application to high speed transportation systems in which vehicles operate along prepared tracks at high speeds. In such an application the primary member of the linear induction motor is usually carried by the vehicle and the secondary member carried on the track, although the reverse arrangement is possible.

A type of rapid transportation system to which polyphase linear induction motors are of special relevance is that which uses air cushion vehicles, because the contactless nature of the motor can be utilised to the full.

Conventional practice in the application of linear induction motors to rapid transportation systems is to use motors in which the working flux, that is the flux which links the primary and secondary members and reacts with the currents induced in the secondary member to produce propulsive force, passes at least partially longitudinally of the motor. Such an arrangement, however, is becoming increasingly unsatisfactory as the operating speeds required of rapid transportation systems increase. The reason for this is the fact that, for a particular value of the flux density in the air gap between the primary and secondary members, the depth of the motor magnetic material required to take the working flux increases with the pole pitch. Thus the higher the designed synchronous speed, the greater the depth of magnetic material needed for the same supply frequency.

According to a feature of the invention a polyphase linear induction motor comprises a primary member and a secondary member spaced [magnetically] apart [transversely of the motor] *with a single planar air gap therebetween,* said primary member comprising magnetic material and polyphase winding means formed on said magnetic material and arranged, when energised from a polyphase alternating current supply, for creating a field of magnetomotive force which travels longitudinally of the primary member, said secondary member comprising electrically conductive material and further magnetic material for forming in combination with the primary member magnetic material low reluctance paths for the passage of the working flux created by said travelling field, said low reluctance paths passing through the electrically conductive material whereby the working flux induces in the electrically conductive material currents which react with the working flux to produce a longitudinally directed force between the primary and secondary members, the arrangement being such that each said low reluctance path lies substantially in a plane which is transverse to the motor whereby for a given flux density in the air gap between the primary and secondary members the depth of magnetic material required is substantially independent of the pole pitch.

According to a further feature of the invention a polyphase linear induction motor comprises a primary member and a secondary member spaced [magnetically] apart [transversely of the motor] *with a single planar air gap therebetween,* said primary member comprising magnetic material and polyphase winding means formed on said magnetic material and arranged, when energised from a polyphase alternating current supply, for creating a field of magnetomotive force which travels longitudinally of the primary member, said secondary member comprising electrically conductive material and further magnetic material for forming in combination with the primary member magnetic material low reluctance paths for the passage of the working flux created by said travelling field, said low reluctance paths passing through the electrically conductive material whereby the working flux induces in the electrically conductive material currents which react with the working flux to produce a longitudinally directed force between the primary and secondary members, the arrangement being such that each said low reluctance path lies substantially in a plane which is transverse to the motor whereby for a given flux density in the air gap between the primary and secondary members the depth of magnetic material required is substantially independent of the pole pitch, each said low reluctance path passing only once through the electrically conductive material.

Arranging that each low reluctance path passes only once through the electrically conductive material may have several advantages amongst which are reductions in the total air gap and in the width of electrically conductive material required. Another possible advantage is that, because room has to be allowed for currents in the electrically conductive material due to only one part of the low reluctance path, more space may be available for accommodating winding ends of the polyphase winding means.

The motor magnetic circuit may be such as to provide only one low reluctance path across the width of the motor or it may provide two low reluctance paths side-by-side, each pair of low reluctance paths being provided by a common part of the primary member magnetic material. In a former such arrangement the primary member may be of generally U-shaped cross-section; in a latter such arrangement the primary member may be of generally E-shaped cross-section.

In order that the invention may be more fully understood, several linear induction motors in accordance with the invention will now be described, by way of example, with reference to the accompanying diagrammatic drawings in which:

FIGS. 1, 2 and 3 each show known linear induction motors;

Figure 7:
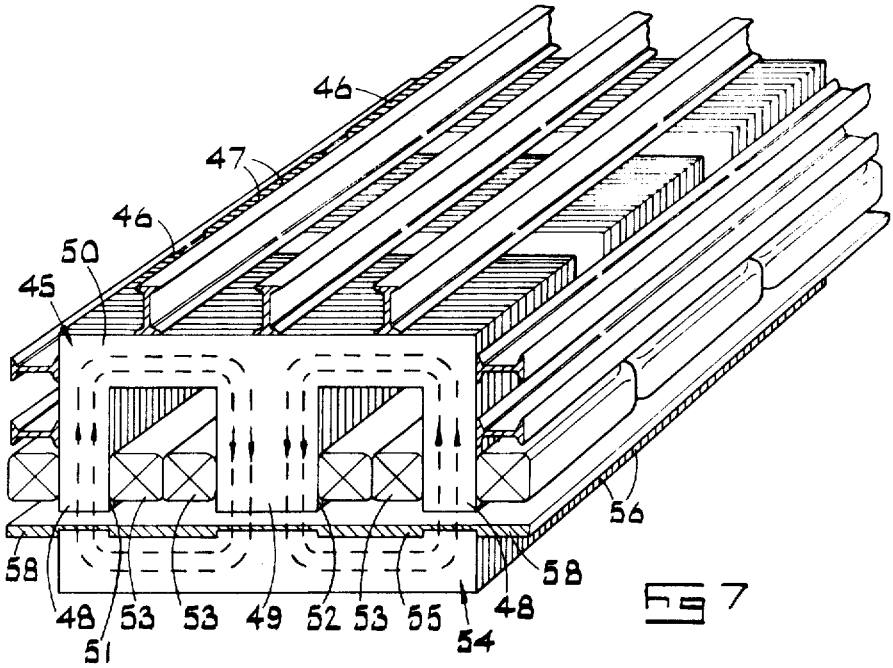

FIG. 7 similarly shows a fourth linear induction motor in accordance with the invention;

FIG. 8 similarly shows a fifth linear induction motor in accordance with the invention; and FIG. 9 illustrates an important application of the invention.

The linear induction motor shown in Figure 1 is known and has a primary member 1 formed of longitudinally extending laminations 2 of magnetic material arranged for co-operation with a secondary member 3 which comprises an aluminium reaction plate 4 backed by further longitudinally extending laminations 5 of magnetic material. Transverse slots 6 are formed in the face of the primary member magnetic material which opposes the secondary member, and in these slots are received the winding conductors of a double-layer lap-wound polyphase winding of which some of the winding ends are shown in the drawing and are indicated by the reference numeral 7.

The linear induction motor shown in Figure 2 is also known and differs from the motor of Figure 1 only in the winding provided. Whereas the winding of Figure 1 is face-wound and multi-layer, the winding of Figure 2 is formed of separate windings 8 wound in a Gramme ring manner and disposed in spaced relation longitudinally of the primary member.

Figure 3 shows an arrangement which is disclosed in German Pat. 643,316. A vehicle having a body 10 is suspended magnetically from an iron plate 11 by magnet coils 12 and 13 wound around the outer limbs 14 and 15 of a generally E-shaped magnetic core 16. It is stated in the German Specification that in order to propel the vehicle the suspending magnets or magnets specially provided may be formed with a multiple winding which is energised from a polyphase supply; electrically conductive rails are provided in the track and these rails co-operate electromagnetically with the flux produced by the E-shaped core and associated polyphase winding to propel the vehicle along the track.

In each of the three linear induction motors described above the working flux, i.e. the flux which crosses the air gap between the primary and secondary members and co-operates with currents which it induces in the secondary member conductive material to produce propulsive force, passes at least in part longitudinally of the motor. Thus for a given air gap flux density the depth of secondary member magnetic material which must be provided is related to the pole pitch of the winding on the primary member. The greater the pole pitch, the greater the depth of secondary member backing material required.

As is later to be described with reference to Figure 9, an important application of the invention is to high speed transport, particularly to high speed transportation systems using air cushion vehicles.

In such systems the primary member of the linear induction motor is carried by the vehicle and the secondary member is carried on the track. Because the secondary member extends the length of the track it constitutes a considerable part of the cost of the system as a whole and it is very desirable that the cost of the secondary member magnetic material is made as small as possible. The linear induction motors in accordance with the invention and now to be described with reference to the accompanying drawings are such that the depth of secondary member magnetic material which is required is independent of the pole pitch so that high synchronous speeds (e.g. 250 m.p.h.) may be provided at low supply frequencies (e.g. 50 Hz. and 60 Hz.) without intolerable depths of secondary member backing material being required.

Figure 4:
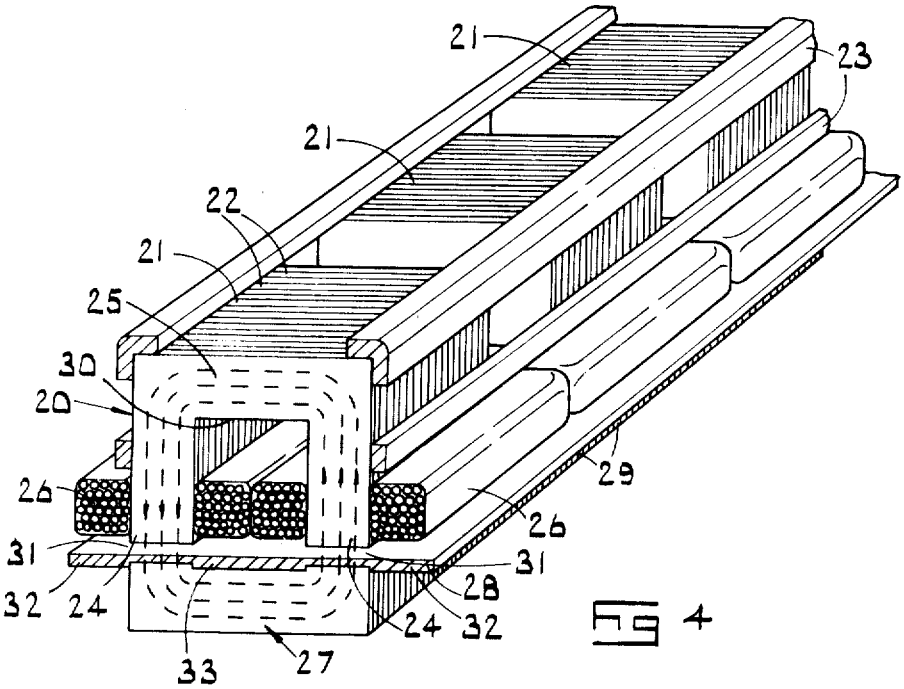
FIG. 4 shows a first linear induction motor in accordance with the invention in perspective view.

FIG. 4 shows the first linear induction motor in accordance with the invention. The primary member 20 of this motor is formed of stacks 21 of mutually insulated magnetic laminations 22; the lamination stacks 21 are spaced longitudinally of the motor and secured together by longitudinally extending members 23 of nonmagnetic material. Each lamination 22 is disposed in a plane lying transversely of the motor and is generally U-shaped so that each lamination stack has two limb portions 24 joined by a yoke portion 25 and spaced apart by a longitudinally extending slot 30.

Each lamination stack 21 has its limb portions 24 separately wound with a winding 26. The two windings of each stack are connected together for energization from a phase of a three phase alternating current supply and in a sense to drive flux in the same direction around the laminations 22 of the stack.

The secondary member of the induction motor is generally indicated by the reference numeral 27 and comprises a reaction plate 28 of aluminium or other electrically conductive material backed by magnetic laminations 29. The laminations 29 extend continuously along the secondary member and are each disposed in a plane which lies transversely of the motor.

In operation the windings 26 are energised from a three phase alternating current supply. The windings of successive lamination stacks 21 along the motor are energised from the phases of the supply taken in succession, so that each of the three pairs of windings 26 shown will be energised from a respective one of the three phases.

In response to this energisation the primary member creates a field of magnetomotive force which travels longitudinally of the motor. The magnetic laminations of the primary and secondary members provide in combination low reluctance paths for magnetic flux, these paths following the planes of the laminations and therefore lying in planes which are directed transversely of the motor. The magnetomotive force created by the energisation of the windings 26 drives flux around these low reluctance flux paths. In passing through the air gaps 31 between the limb portions 24 and the opposed parts of the secondary member laminations 29, this flux passes through the reaction plate 28 and induces in the plate currents which flow in generally rectangular patterns in the plane of the plate.

The parts of these paths which extend transversely of the motor pass beneath the limb portions 24 and react with the flux passing through the air gap at that point to produce the desired longitudinally directed propulsive force. In response to this force the primary and secondary members move relatively to one another in a longitudinal direction.

The parts of the current paths in the plate 28 which are directed longitudinally of the motor are useless so far as the generation of propulsive force is concerned, because the force they would produce by co-operation with the flux crossing the air gaps 31 is transverse to the motor. In order, therefore, to allow these longitudinal parts of the reaction plate current paths to pass in the reaction plate otherwise than beneath the air gaps 31, the reaction plate is formed with flange portions 32 which project laterally beyond each side of the motor magnetic material and are therefore substantially free of working flux.

It will therefore be appreciated that the longitudinal parts of the reaction plate current paths are provided on the edges of the motor by the flange portions 32 and between the limb portions by the part 33 of the reaction plate extending across the slot 30. In order to give them a low electrical resistance, the parts 32 and 33 of the reaction plate are thickened as shown.

The three lamination stacks and associated windings shown in FIG. 4 represent one pole pitch of the travelling field produced by the windings. It will be appreciated, however, that the motor primary member can be extended to provide a greater number of poles by repeating the primary member as shown the appropriate number of times. Thus to give a four pole motor the primary member of FIG. 4 would be provided with twelve lamination stacks 21 successively wound with windings from the three phases taken in rotation.

Figure 5:
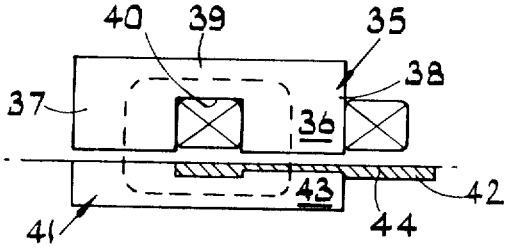
FIG. 5 shows a second linear induction motor in accordance with the invention in sectional end elevation.

The induction motor shown in FIG. 5 is similar to that of FIG. 4 in that its primary member 35 is formed of longitudinally spaced stacks of transversely orientated laminations 36. The laminations are generally U-shaped, so that as in the motor of FIG. 4 each lamination stack has two limb portions 37 and 38 joined by a yoke portion 39 and forming a longitudinal slot 40 between them. However, whereas in FIG. 4 each phase winding on a stack is formed of two windings one on each limb portion, in FIG. 5 each phase winding on a lamination stack is formed on only the limb portion 38 of each stack.

The secondary member 41 of the motor of FIG. 5 comprises a reaction plate 42 and transversely orientated laminations 43 which extend continuously along the secondary member. Whereas in FIG. 4 the reaction plate 28 extends right across the secondary member, in FIG. 5 the reaction plate 42 extends across the slot 40 but stops just short of the part of the secondary member opposite the unwound limb portion 37. The reaction plate 42 has a flange portion 44 which projects beyond the magnetic material laterally of the motor, and this flange portion together with the part of the reaction plate beneath the slot 40 provide longitudinal parts of the reaction plate current paths which, as previously described, are substantially free of working flux. As in FIG. 4, the parts of the reaction plate providing for longitudinal current flow are thickened to reduce resistance.

It will be seen that, whereas the arrangement of FIG. 4 is such that the low reluctance paths for working flux pass twice through the reaction plate 28, the arrangement of FIG. 5 is such that working flux passes only once through the reaction plate 42.

By stopping the plate 42 short of the limb portions 37, the end face of the limb portions 37 and the opposed part of the secondary member laminations 41 may be arranged to co-operate with one another with a correspondingly reduced air gap between them as shown thus reducing the total air gap of the low reluctance paths and thereby enabling an improved power factor and increased efficiency to be achieved. A further advantage of stopping the reaction plate 42 short of the limb portion is that the width of the reaction plate, and hence its cost, is reduced.

In two further possible arrangements in accordance with the invention the primary member of FIG. 5 is arranged to co-operate with the secondary member of FIG. 4, and vice-versa.

Figure 6:
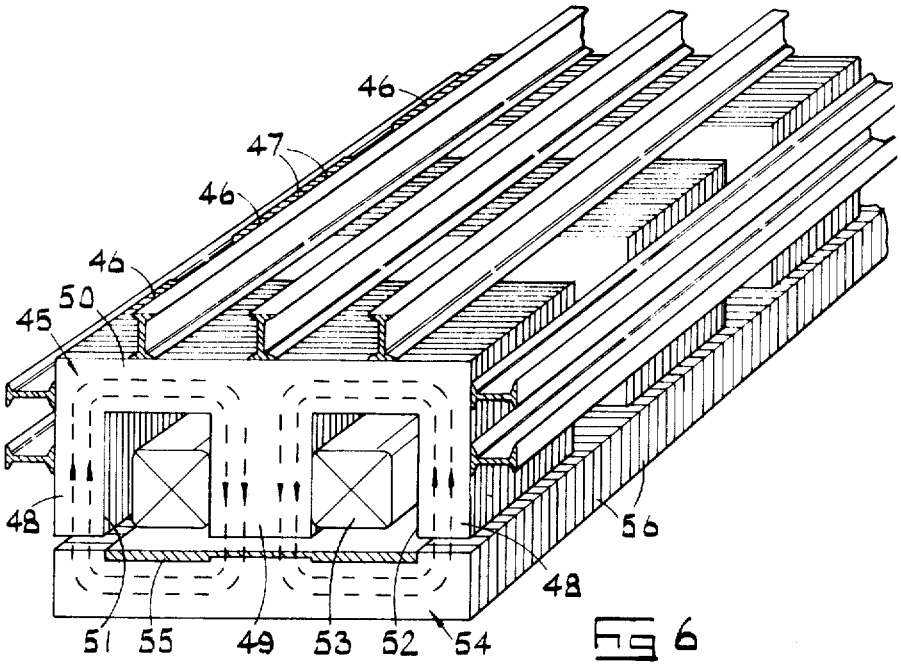
FIG. 6 shows a third linear induction motor in accordance with the invention in perspective view.

Referring now to FIG. 6, the third embodiment of the invention has the magnetic material of its primary member 45 formed of longitudinally spaced stacks 46 of laminations 47. Each lamination lies in a transversely orientated plane and is generally E-shaped, so that each lamination stack 46 has two outer limb portions 48 and a central limb portion 49 joined by yoke portion 50 and forming between them two longitudinal slots 51 and 52.

Each central limb portion 49 is formed with a winding 53, and for operation the windings 53 of successive lamination stacks are energised from the phases of a three phase supply taken in rotation, as has previously been described with reference to FIGS. 4 and 5.

The secondary member 54 comprises a reaction plate 55 backed by magnetic material formed of transversely orientated laminations 56 which continuously extend longitudinally of the motor. The reaction plate 55 extends between the remote edges of the longitudinal slots 51 and 52 and is thickened beneath the slots to reduce the resistance.

Beyond the edges of the reaction plate the secondary member laminations 56 directly oppose the ends of the outer limb portions 48, the gap between the opposed surfaces being the same as that between the central limb portions 49 and the opposed part of the reaction plate.

The operation of the motor of FIG. 6 is basically the same as that of the motors of FIGS. 4 and 5. Whereas, however, the motors of FIGS. 4 and 5 only have one low reluctance path across the width of the motor, the motor in FIG. 6 provides low reluctance paths side-by-side in pairs. It will be seen that these pairs of low reluctance paths include central limb portions 49 in common, and to that end the central limb portions are made approximately twice as wide as each of the outer limb portions 48.

The motor of FIG. 7 is similar to that of FIG. 6 in many respects and where appropriate like reference numerals are used to indicate like parts. Whereas in FIG. 6, however, only the central limb portion 49 of each lamination stack is wound and the reaction plate does not extend beneath the outer limb portions 48, in FIG. 7 all the limb portions are wound and the plate is correspondingly extended beneath and beyond the outer limb portions to project laterally of the motor in thickened flange portions 58. It will be appreciated that in operation these flange portions perform the same function as the flange portions 32 and 44 of FIGS. 4 and 5.

It will also be appreciated that on each lamination stack the windings are connected together for energisation from the same phase of the alternating current supply. The sense of the windings is such that the outer windings assist the central winding in driving the flux around the low reluctance paths, as indicated in the drawing by the dotted lines.

FIG. 8 shows a fifth embodiment of the invention having the primary member of the motor of FIG. 7 in combination with the secondary member of the motor of FIG. 6.

In all the deescribed embodiments of the invention the magnetic material of both primary and secondary members is formed of laminations which lie in plane directed transversely of the motor to provide in combination low reluctance paths for working flux which are themselves orientated transversely of the motor. It will be appreciated that the primary and secondary member currents will to some extent distort the paths taken by the working flux from the truly transverse planes, but this effect will be small and for a given flux density between the primary and secondary members the depth of the magnetic material required will be substantially independent of the pole pitch of the polyphase winding because the cross-sectional area of the path through which the working flux passes in a longitudinally directed plane perpendicular to the general plane of the air gap, being the product of pole pitch and core depth, is proportional to pole pitch. The core depth is the depth of the primary member magnetic material minus the teeth or of the secondary member magnetic material.

In addition to the previously mentioned advantages of reduced plate width and reduced total air gap, the restriction of the electrically conductive material of the secondary member to only one of the air gaps in each low reluctance path (as in FIGS. 5, 6 and 8) has other advantages. Amongst these further advantages are that for a particular motor width there is liable to be more space for end windings because the plate has only to take currents due to the associated limb portion of the primary member. The restriction of the polyphase winding to one limb portion only of the primary member (as in FIGS. 5 and 6) may be advantageous because, inter alia, it reduces the primary leakage reactance in some motor configurations.

Although the described embodiments of the invention each have a polyphase winding formed of simple coils which are spaced apart longitudinally of the motor and are disposed in a single plane which is generally parallel to the secondary member, other configurations of polyphase winding are possible. For example a polyphase winding for a linear induction motor in accordance with the invention may be formed of Gramme ring windings disposed on the primary member magnetic material in longitudinal planes generally perpendicular to the secondary member, or it may have more than one winding layer, windings from different phases being arranged in overlapping relationship. Clearly a large number of magnetic cores per pole is possible, combined with other and known forms of polyphase windings.

FIG. 9 illustrates an important application of the invention to the propulsion of an air cushion vehicle 60 along a generally T-shaped track 61. The vehicle is supported above the track by pairs of laterally spaced air cushion pads 62 co-operating with the horizontal top track surface 63, and is guided along the track by the co-operation of further air cushion pads 64 with the vertical side surfaces 65 provided by the leg of the track.

The vehicle is propelled along the track by a linear induction motor in accordance with the present invention, the motor having its secondary member 66 inset into the top track surface 63 with its reaction plate (not separately shown) uppermost. The primary member 67 of the motor is mounted on the vehicle for co-operation with the secondary member.

We claim:

1. A polyphase linear induction motor comprising a primary member and a secondary member spaced [magnetically] apart [transversely of the motor] *with a single planar air gap therebetween,* said primary member comprising magnetic material and polyphase winding means formed on said magnetic material and arranged, when energised from a polyphase alternating current supply, for creating a field of magnetomotive force which travels longitudinally of the primary member, said secondary member comprising electrically conductive material and further magnetic material for forming in combination with the primary member magnetic material low reluctance paths for the passage of the working flux created by said travelling field, said low reluctance paths passing through the electrically conductive material whereby the working flux induces in the electrically conductive material currents which react with the working flux to produce a longitudinally directed force between the primary and secondary members, the arrangement being such that each said low reluctance path lies substantially in a plane which is transverse to the motor whereby for a given flux density in the air gap between the primary and secondary members the depth of magnetic material required is substantially independent of the pole pitch.

2. A polyphase linear induction motor comprising a primary member and a secondary member spaced [magnetically] apart [transversely of the motor] *with a single planar air gap therebetween,* said primary member comprising magnetic material and polyphase winding means formed on said magnetic material and arranged, when energised from a polyphase alternating current supply, for creating a field of magnetomotive force which travels longitudinally of the primary member, said secondary member comprising electrically conductive material and further magnetic material for forming in combination with the primary member magnetic material low reluctance paths for the passage of the working flux created by said travelling field, said low reluctance paths passing through the electrically conductive material whereby the working flux induces in the electrically conductive material currents which react with the working flux to produce a longitudinally directed force between the primary and secondary members, the arrangement being such that each said low reluctance path lies substantially in a plane which is transverse to the motor whereby for a given flux density in the air gap between the primary and secondary members the depth of magnetic material required is substantially independent of the pole pitch, each said low reluctance path passing only once through the electrically conductive material.

3. A linear induction motor according to Claim 1, wherein the primary and secondary member magnetic material is so arranged that the low reluctance paths are provided in longitudinally spaced pairs, the low reluctance paths of each pair being side-by-side transversely of the motor and being in part provided in common by a common portion of the primary member magnetic material, working flux passing in the low reluctance paths of each pair passing in the respective said common portion in an additive manner.

4. A linear induction motor according to Claim 2, wherein the primary and secondary member magnetic material is so arranged that the low reluctance paths are provided in longitudinally spaced pairs, the low reluctance paths of each pair being side-by-side transversely of the motor and being in part provided in common by a common portion of the primary member magnetic material, working flux passing in the low reluctance paths of each pair passing in the respective said common portion in an additive manner, the electrically conductive material being so disposed that in each low reluctance path the conductive material lies between the secondary member magnetic material and only the respective said common portion of the primary member magnetic material,

5. A linear induction motor according to Claim 3, wherein the polyphase winding means is disposed wholly on the said common portions of the primary member magnetic material.

6. A linear induction motor according to Claim 3, wherein the polyphase winding means is disposed on the said common portions of the primary member magnetic material and also on further parts of the primary member magnetic material separately providing further parts of the low reluctance paths.

7. A linear induction motor according to Claim 4, wherein transversely of the motor the secondary member presents to the primary member two spaced portions of the secondary member magnetic material with the conductive material therebetween, the said two spaced portions opposing correspondingly spaced portions of the primary member magnetic material and the conductive material opposing the said common portions of the primary member magnetic material and extending transversely of the motor beyond the said common portions on either side thereof for providing parts of the conductive material current paths which extend longitudinally of the motor and are substantially free of working flux.

8. A linear induction motor according to Claim 7, wherein the said parts of the conductive member which extend transversely of the motor beyond the said common portions of the primary member magnetic material are thicker than the part of the conductive material opposing the common portions.

9. A linear induction motor according to Claim 3, wherein the primary member magnetic material comprises a plurality of longitudinally spaced and generally E-shaped stacks of transverse laminations, each lamination stack being formed of three generally parallel limb portions joined by a yoke portion and having the ends of the limb portions generally co-planar, the polyphase winding means being disposed on at least the centre ones of the limb portions, the secondary member magnetic material comprising a plurality of longitudinally arranged transverse laminations and being generally U-shaped having two limb portions joined by a yoke portion and having the conductive material received within the concavity thereby defined so that the conductive material in combination with the ends of the limb portions of the secondary member magnetic material presents to the primary member a generally plane face, the ends of the outer ones of the limb portions of the primary member magnetic material being opposed to the ends of the limb portions of the secondary member magnetic material and the said centre limb portions of the primary member magnetic material providing the said common portions and having their ends opposed to the conductive material, the conductive material extending transversely of the motor beyond the centre limb portions on either side thereof for providing parts of the conductive material current paths which extend longitudinally of the motor and are substantially free of working flux.

10. A linear induction motor according to Claim 9, wherein the parts of the conductive material which extend transversely of the motor beyond the central limb portions of the primary member magnetic material are thicker than the part of the conductive material opposing the central limb portions.

11. A linear induction motor according to Claim 1, wherein the primary member magnetic material comprises a plurality of longitudinally spaced and generally U-shaped stacks of transverse laminations, each lamination stack being formed of two generally parallel limb portions joined by a yoke portion, the secondary member magnetic material comprising a plurality of longitudinally arranged transverse laminations and the conductive material being interposed between the secondary member magnetic material and the primary member magnetic material at the said limb portions thereof and extending transversely of the motor between and beyond the motor magnetic material at either side thereof for providing parts of the conductive material current paths which extend longitudinally of the motor and are substantially free of working flux.

12. A linear induction motor according to Claim 11, wherein the polyphase winding means is formed on each said limb portion of each said lamination stack.

13. A linear induction motor according to Claim 2, wherein the primary member magnetic material comprises a plurality of longitudinally spaced stacks of transverse laminations, each lamination stack having two generally parallel limb portions joined by a yoke portion, the polyphase winding means being disposed on at least one said limb portion of each stack, the conductive material being interposed between the secondary member magnetic material and a limb portion of each lamination stack formed with the polyphase winding means, the other limb portion of each stack directly opposing the secondary member magnetic material at its end, the conductive material extending transversely of the motor on either side of the associated limb portions for providing parts of the conductive material current paths which extend longitudinally of the motor and are substantially free of working flux.

14. A linear induction motor according to Claim 1 in combination with a gas cushion vehicle and a track along which the vehicle is arranged to operate, the motor being provided for propelling the vehicle along the track and having its primary member carried by the vehicle and its secondary member forming part of the track.

15. A linear induction motor according to Claim 2, wherein the primary and secondary member magnetic material is so arranged that the low reluctance paths are provided in longitudinally spaced pairs, the low reluctance paths of each pair being side-by-side transversely of the motor and being in part provided in common by a common portion of the primary member magnetic material, working flux passing in the low reluctance paths of each pair passing in the respective said common portion in an additive manner.

16. A linear induction motor according to Claim 4, wherein the polyphase winding means is disposed wholly on the said common portions of the primary member magnetic material.

17. A linear induction motor according to Claim 4, wherein the polyphase winding means is disposed on the said common portions of the primary member magnetic material and also on the parts of the primary member magnetic material separately providing further parts of the low reluctance paths.

References Cited

The following references, cited by the Examiner, are of record in the patented file of this patent or the original patent.

UNITED STATES PATENTS

| | | | |
|---|---|---|---|
| 782,312 | 2/1905 | Zehden | 310—13 |
| 2,993,130 | 7/1961 | Laithwaite | 310—13 |
| 3,335,300 | 8/1967 | Von Brimer | 310—13 |
| 3,370,191 | 2/1968 | Koch | 310—13 X |

FOREIGN PATENTS

| | | |
|---|---|---|
| 342,042 | 8/1904 | France. |

DONOVAN F. DUGGAN, Primary Examiner

U.S. Cl. X.R.

104—148 LM